US010612600B2

(12) United States Patent
Oda

(10) Patent No.: US 10,612,600 B2
(45) Date of Patent: Apr. 7, 2020

(54) JOURNAL BEARING, ROTARY MACHINE, AND JOURNAL BEARING-MANUFACTURING METHOD

(71) Applicant: MITSUBISHI HEAVY INDUSTRIES COMPRESSOR CORPORATION, Tokyo (JP)

(72) Inventor: Takashi Oda, Hiroshima (JP)

(73) Assignee: MITSUBISHI HEAVY INDUSTRIES COMPRESSOR CORPORATION, Tokyo (JP)

(*) Notice: Subject to any disclaimer, the term of this patent is extended or adjusted under 35 U.S.C. 154(b) by 0 days.

(21) Appl. No.: 16/192,971

(22) Filed: Nov. 16, 2018

(65) Prior Publication Data

US 2019/0195284 A1 Jun. 27, 2019

(30) Foreign Application Priority Data

Dec. 22, 2017 (JP) ................................. 2017-246331

(51) Int. Cl.
*F16C 41/00* (2006.01)
*F16C 17/02* (2006.01)
(Continued)

(52) U.S. Cl.
CPC .......... *F16C 41/007* (2013.01); *F01D 25/166* (2013.01); *F16C 17/02* (2013.01); *F16C 17/243* (2013.01); *F16C 33/046* (2013.01); *F16C 33/08* (2013.01); *F16C 35/02* (2013.01); *F16C 41/00* (2013.01); *F16C 43/02* (2013.01); *F04D 29/046* (2013.01); *F16C 2233/00* (2013.01); *F16C 2240/60* (2013.01); *F16C 2360/44* (2013.01)

(58) Field of Classification Search
CPC ........ F16C 17/02; F16C 17/243; F16C 35/02; F16C 41/007; F16C 43/02; F16C 2233/00; F04D 29/043; F04D 29/046; F01D 25/166; G01L 7/00
USPC ......... 384/91, 129, 273, 280, 448, 279, 283; 324/207.13
See application file for complete search history.

(56) References Cited

U.S. PATENT DOCUMENTS 4,464,935 A * 8/1984 McHugh ................ G01H 1/003
73/660
6,080,982 A 6/2000 Cohen
(Continued)

FOREIGN PATENT DOCUMENTS

DE 102010049552 A1 * 4/2012 ........... G01D 11/245
KR 20010064028 A * 7/2001 ............. F04D 29/00
(Continued)

*Primary Examiner* — Marcus Charles
(74) *Attorney, Agent, or Firm* — Osha Liang LLP

(57) ABSTRACT

A journal bearing is provided that supports a rotating shaft to be rotatable around a central axis and includes: a bearing main body that has a sliding contact surface that is in sliding contact with the rotating shaft, an outer circumferential surface that is directed outward in the radial direction to face a side opposite to the sliding contact surface, a recess that is recessed from an outer circumferential surface of the bearing main body inward in the radial direction, and a groove that continuously extends from the recess; a sensor main body that is housed in the recess; and a sensor wiring whose one end is connected to the sensor main body and in which a part thereof in a length direction is housed in the groove.

9 Claims, 5 Drawing Sheets

(51) Int. Cl.
*F16C 35/02* (2006.01)
*F16C 43/02* (2006.01)
*F16C 33/08* (2006.01)
*F01D 25/16* (2006.01)
*F16C 33/04* (2006.01)
*F16C 17/24* (2006.01)
*F04D 29/046* (2006.01)

(56) References Cited

U.S. PATENT DOCUMENTS

| | | | |
|---|---|---|---|
| 2009/0223083 A1* | 9/2009 | LeCrone | F16C 17/02 34/524 |
| 2011/0018529 A1* | 1/2011 | Soyama | G01D 5/145 324/207.25 |
| 2013/0099107 A1* | 4/2013 | Omoto | F16C 41/007 250/231.13 |
| 2015/0362012 A1* | 12/2015 | Ermilov | F16C 17/024 384/105 |
| 2016/0298691 A1* | 10/2016 | Dowie | F16C 41/008 |
| 2017/0045052 A1* | 2/2017 | Brostrom | F04C 23/008 |
| 2017/0122366 A1* | 5/2017 | Kuhlmann | B63H 25/52 |
| 2017/0167292 A1* | 6/2017 | Army | B64D 13/08 |

FOREIGN PATENT DOCUMENTS

| | | | | |
|---|---|---|---|---|
| KR | 20120019584 A | * | 3/2012 | G01K 1/14 |
| KR | 20130027814 A | * | 3/2013 | G01L 1/00 |
| WO | JP 2007232736 A | * | 9/2007 | G01M 19/00 |
| WO | WO-2018033322 A1 | * | 2/2018 | F16C 41/007 |

* cited by examiner

JOURNAL BEARING, ROTARY MACHINE, AND JOURNAL BEARING-MANUFACTURING METHOD

CROSS-REFERENCE TO RELATED APPLICATION

Priority is claimed on Japanese Patent Application No. 2017-246331, filed Dec. 22, 2017, the content of which is incorporated herein by reference.

BACKGROUND

Field

The present disclosure relates to a journal bearing, a rotary machine, and a journal bearing-manufacturing method.

Description of Related Art

In various rotary machines or the like, a journal bearing (a sliding bearing) is used as a bearing that supports a rotating shaft. The journal bearing includes a babbit metal that is in sliding contact with an outer circumferential surface of the rotating shaft, and a support that supports the babbit metal. In the journal bearing, due to friction generated between the journal bearing and the rotating shaft, a temperature of the babbit metal and a temperature of a lubricant interposed between the babbit metal and the rotating shaft rise. To properly manage these temperatures, a temperature sensor for detecting a temperature of the journal bearing is sometimes provided. The temperature sensor is disposed at a position as close as possible to the babbit metal in order to raise detection accuracy thereof.

In Patent Document 1, a sensor that is different from a temperature sensor and is used to measure a clearance between a rotating shaft and a bearing surface of a bearing is provided on the bearing. This sensor has a sensor wiring (an optical fiber line) provided with a sensor main body (a luminant) at a tip thereof. The sensor main body has an annular shape that is continuous in a circumferential direction on an outer side of the rotating shaft in a radial direction. One end of the sensor wiring is connected to the sensor main body. The sensor wiring is led outside through an insertion hole formed in a bearing liner or a bearing shell. The insertion hole through which the sensor wiring is inserted has a radial passage portion or an axial passage portion.
[Patent Document 1] U.S. Pat. No. 6,080,982

However, in the constitution as disclosed in Patent Document 1, to insert the sensor wiring, the radial passage portion or the axial passage portion serving as the insertion hole should be formed in a bearing main body. This requires labor or cost associated with machining. Furthermore, since the sensor wiring is inserted through the formed insertion hole, a degree of freedom of the wiring is reduced. For this reason, it is required to improve the degree of freedom of the wiring to easily and efficiently perform mounting of the sensor on the bearing.

The present disclosure provides a journal bearing, a rotary machine, and a journal bearing-manufacturing method that enable mounting of a sensor on a bearing to be easily and efficiently performed.

SUMMARY

A journal bearing according to a first aspect of the present disclosure is a journal bearing that supports a rotating shaft to be rotatable around a central axis, and includes: a bearing main body configured to have a sliding contact surface that is brought into slidable contact with the rotating shaft and is directed inward in a radial direction, an outer circumferential surface that is directed outward in the radial direction to face a side opposite to the sliding contact surface, a recess that is recessed from the outer circumferential surface inward in the radial direction, and a groove that is recessed from the outer circumferential surface to be continuous with the recess and extends along the outer circumferential surface; a sensor main body housed in the recess; and a sensor wiring whose one end is connected to the sensor main body and in which a part thereof in a length direction is housed in the groove.

With this constitution, the sensor main body and the part of the sensor wiring in the length direction are housed in the recess and the groove of the outer circumferential surface of the bearing main body. For this reason, the sensor main body and the sensor wiring can be disposed along the outer circumferential surface of the bearing main body. Therefore, the sensor main body and the sensor wiring can be easily mounted on the bearing main body. The recess and the groove need only to be formed in the outer circumferential surface of the bearing main body, and machining can be easily performed. Furthermore, the journal bearing in which the sensor main body is housed in the recess of the bearing main body and simultaneously the part of the sensor wiring in the length direction is housed in the groove is used. Thereby, the journal bearing can be easily mounted in a rotary machine.

A journal bearing according to a second aspect of the present disclosure may be configured such that, in the first aspect, the sensor main body detects a temperature, and the recess and the sensor main body are disposed at a lower side of the rotating shaft.

With this constitution, due to a self-weight of the rotating shaft, a clearance from the journal bearing is reduced, and an operation state of the rotating shaft can be detected with high accuracy by the sensor main body at the lower side of the rotating shaft where a rise in temperature is easy. Legs or the like for supporting the rotary machine exist at the lower side of the rotating shaft, and in some cases, it is difficult to arrange the sensor main body and the sensor wiring at the lower side of the rotating shaft. Even in this case, the sensor main body and the sensor wiring can be easily mounted.

A journal bearing according to a third aspect of the present disclosure may be configured such that, in the first or second aspect, an end of the groove which is separated from the recess is curved or inclined such that a depth of the groove is gradually reduced in proportion to a distance from the recess.

With this constitution, an acute angle is not formed between the end and the outer circumferential surface, and an excessive force can be inhibited from being applied to the sensor wiring housed in the groove.

A journal bearing according to a fourth aspect of the present disclosure may be configured such that, in any one of the first to third aspects, the bearing main body includes a babbit metal that forms the sliding contact surface, and a support that is provided at an outer side of the babbit metal in the radial direction and supports the babbit metal, and the recess and the groove are formed in the support.

With this constitution, the sensor main body housed in the recess can be disposed at the position at which it is brought close to the support. Because the recess is not made to reach the babbit metal, strength of the babbit metal can be secured.

A journal bearing according to a fifth aspect of the present disclosure may be configured such that, in any one of the first to fourth aspects, the groove extends from the recess in a circumferential direction around the central axis.

With this constitution, the sensor wiring can be disposed to extend along the outer circumferential surface of the journal bearing in the circumferential direction.

A rotary machine according to a sixth aspect of the present disclosure includes: a rotating shaft; the journal bearing that is defined in any one of the first to fifth aspects and supports the rotating shaft to be rotatable around the central axis; and a bearing support configured to support the journal bearing.

With this constitution, the sensor main body and the sensor wiring can be disposed along the outer circumferential surface of the bearing main body. Therefore, the sensor wiring can be easily mounted on the bearing main body. The sensor main body is housed in the recess of the bearing main body in advance, and simultaneously the part of the sensor wiring in the length direction is housed in the groove in advance. Thereby, the journal bearing can be easily mounted in the rotary machine.

A journal bearing-manufacturing method according to a seventh aspect of the present disclosure includes: a process of preparing: a bearing main body that has a sliding contact surface that is brought into slidable contact with the rotating shaft and is directed inward in a radial direction, an outer circumferential surface that is directed outward in the radial direction to face a side opposite to the sliding contact surface, a recess that is recessed from the outer circumferential surface inward in the radial direction, and a groove that is recessed from the outer circumferential surface to be continuous with the recess and extends along the outer circumferential surface; a sensor main body that is able to be housed in the recess; and a sensor wiring whose one end is connected to the sensor main body and in which a part thereof in a length direction is able to be housed in the groove; and a process of housing the sensor main body in the recess of the bearing main body, housing the part of the sensor wiring whose one end is connected to the sensor main body in the groove, and fixing the sensor main body in the recess using an adhesive.

With this constitution, the sensor main body is housed in the recess of the bearing main body in advance, and simultaneously the part of the sensor wiring in the length direction is housed in the groove in advance. Thereby, the journal bearing of a sensor can be easily mounted in the rotary machine.

According to the present disclosure, a sensor can be easily and efficiently mounted on a bearing.

DETAILED DESCRIPTION

Hereinafter, embodiments of a journal bearing, a rotary machine, and an assembling method of the journal bearing of the present disclosure will be described with reference to the attached drawings. However, the present disclosure is not limited to only these embodiments.

Figure 1:
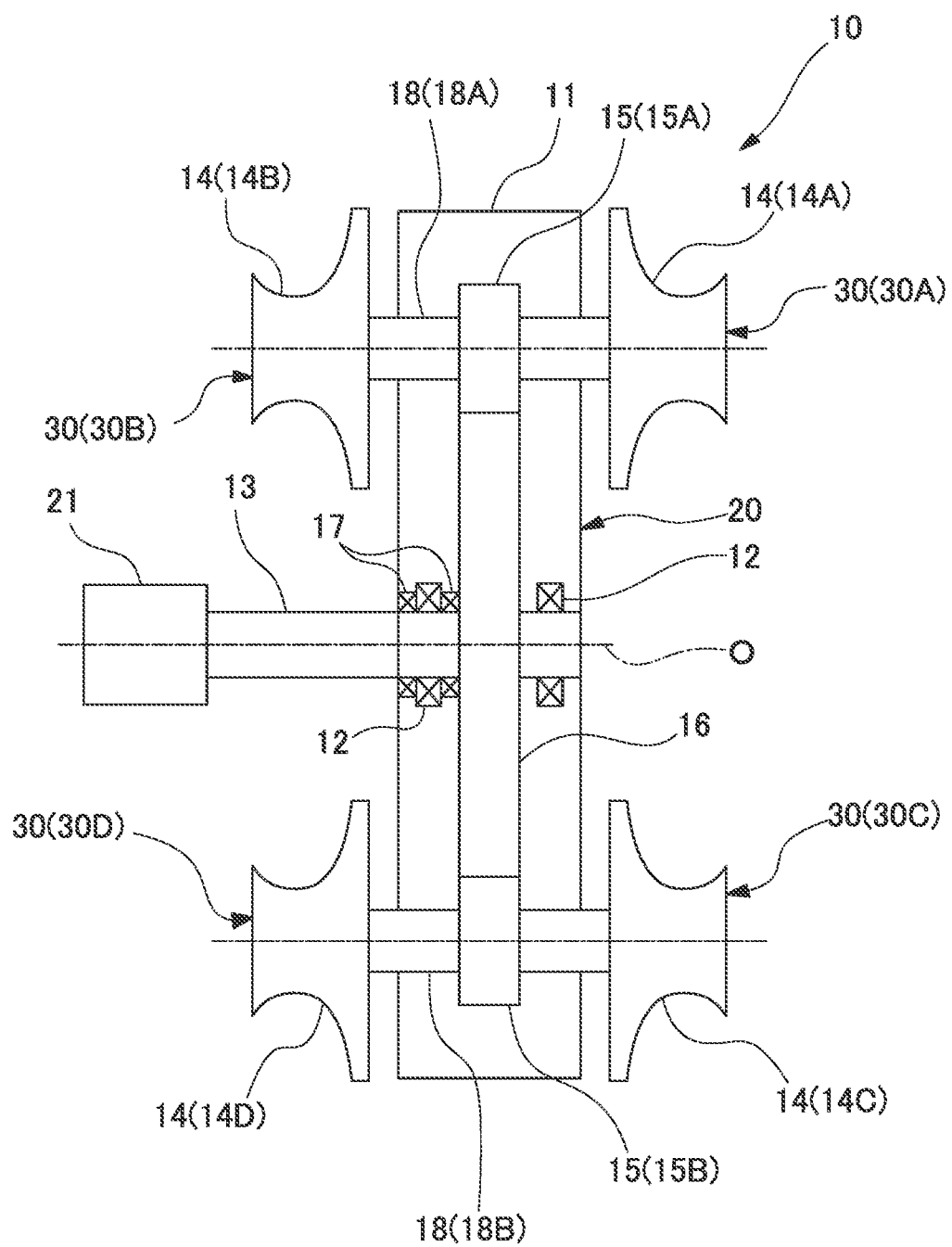
FIG. 1 is a view illustrating a schematic constitution of a geared centrifugal compressor in an embodiment of the present disclosure.
Figure 2:
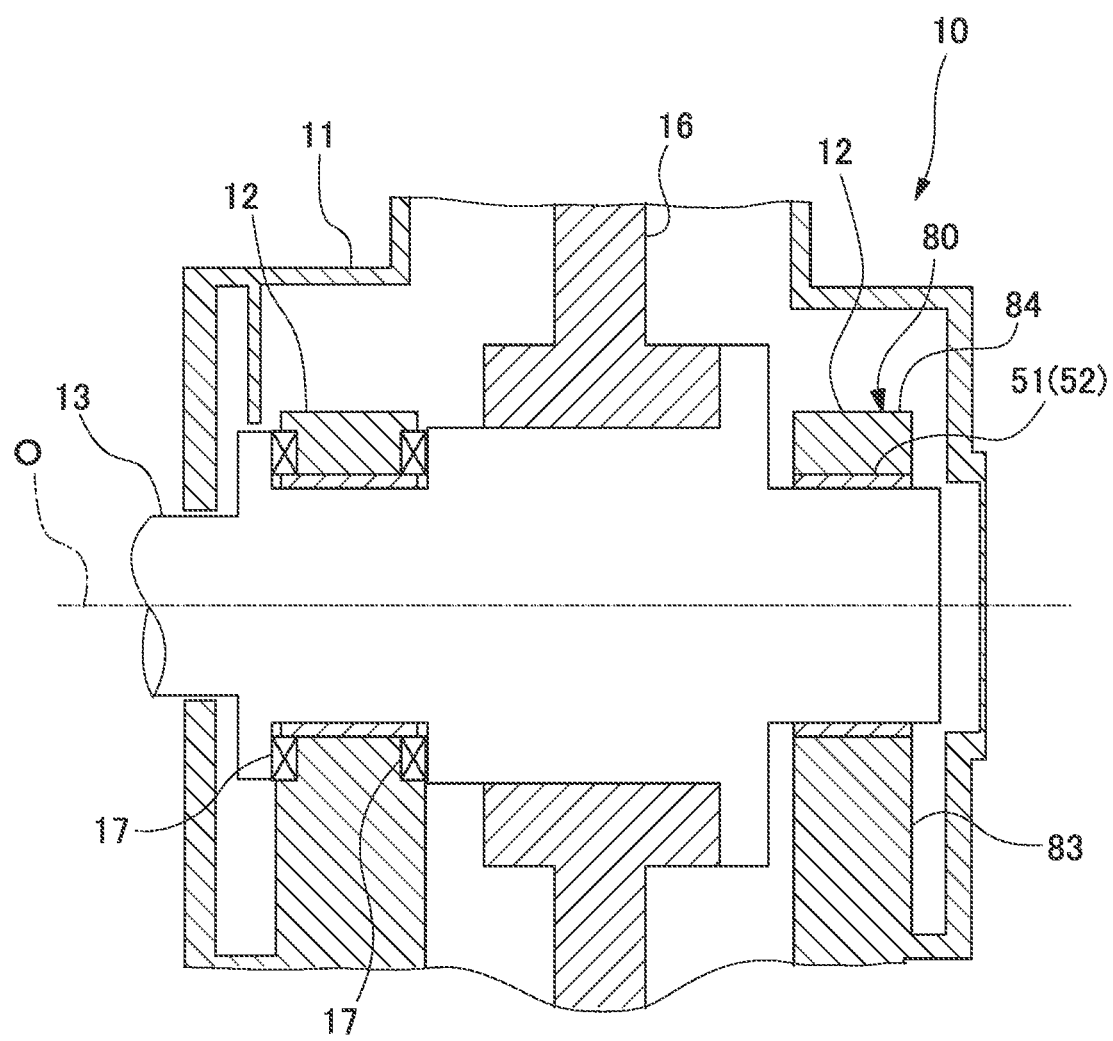
FIG. 2 is a sectional view illustrating journal bearings that support a rotating shaft of the geared centrifugal compressor.

FIG. 1 is a view illustrating a schematic constitution of a geared centrifugal compressor in an embodiment of the present disclosure. FIG. 2 is a sectional view illustrating journal bearings that support a rotating shaft of the geared centrifugal compressor.

As illustrated in FIGS. 1 and 2, a geared centrifugal compressor (a rotary machine) 10 according to the present embodiment includes a driving source 21, a casing 11 (see FIG. 2), journal bearings 12, a rotating shaft (a driving shaft) 13, a bull gear 16, bull gear shafts 18, impellers 14 (see FIG. 1), pinion gears 15, and thrust bearings 17.

The driving source 21 generates power that rotatably drives the rotating shaft 13.

The casing 11 forms an outer shell of the geared centrifugal compressor 10. The casing 11 covers the journal bearings 12, the rotating shaft 13, the impellers 14, and the thrust bearings 17 from an outer circumferential side thereof.

As illustrated in FIG. 1, a pair of journal bearings 12 are provided in the casing 11 at an interval in a direction of a central axis O of the rotating shaft 13. The journal bearings 12 are held in the casing 11.

The rotating shaft 13 has a columnar shape centered on the central axis O. The rotating shaft 13 is supported by the pair of journal bearings 12 to be rotatable around the central axis O thereof. The rotating shaft 13 is driven by the driving source 21 to be rotatable around the central axis O thereof.

The bull gear 16 is rotated along with the rotating shaft 13. The bull gear 16 is fixed to the rotating shaft 13. The bull gear 16 is set to have a greater outer diameter dimension than the pinion gears 15.

The bull gear shafts 18 are driven by the power transmitted from the pinion gears 15 and the bull gear 16 to be rotated around central axes thereof. The bull gear shafts 18 are disposed on both sides between which the rotating shaft 13 is sandwiched. The bull gear shafts 18 extend parallel to the rotating shaft 13. The bull gear shafts 18 of the present embodiment have a first bull gear shaft 18A and a second bull gear shaft 18B.

The pinion gears 15 are fixed to the bull gear shafts 18. The bull gear 16 is meshed with the pinion gears 15. The number of rotations of each of the bull gear shafts 18 to which the pinion gears 15 are fixed is more than that of the bull gear 16. The pinion gears 15 of the present embodiment have a first pinion gear 15A fixed to the first bull gear shaft 18A, and a second pinion gear 15B fixed to the second bull gear shaft 18B.

A speed-up transmission unit 20 that increases the number of rotations of the rotating shaft 13 from the driving source 21 via the bull gear 16 and the pinion gears 15 and transmits it to the bull gear shafts 18 is constituted of the pinion gears 15 and the bull gear 16.

The thrust bearings 17 are provided close to the driving source 21 in the direction of the central axis O relative to the bull gear 16 at positions separated from each other. The thrust bearings 17 are integrally assembled with one of the pair of journal bearings 12 which is disposed close to the driving source 21 relative to the bull gear 16. Movement of the rotating shaft 13 in the direction of the central axis O is restricted by the thrust bearings 17.

The impellers 14 are fixed to opposite ends of each of the bull gear shafts 18 in the direction of the central axis O. The impellers 14 are integrally rotated around the central axis along with each of the bull gear shafts 18. The impellers 14 of the present embodiment are provided on opposite sides of each of the bull gear shafts 18 in the direction of the central axis O. Each of the impellers 14 is an impeller having a plurality of blades in a circumferential direction. The impellers 14 of the present embodiment have a first impeller 14A and a second impeller 14B that are fixed to the first bull gear shaft 18A, and a third impeller 14C and a fourth impeller 14D that are fixed to the second bull gear shaft 18B.

The impellers 14 are covered by the casing 11. The casing 11 has an intake flow passage (not shown) that introduces air acting as a working fluid into the inside by communicating with the outside, and a spiral exhaust flow passage (not shown) that is formed outside the impellers 14 in a radial direction. The impellers 14 are rotated integrally with the bull gear shafts 18, and thereby compress the air introduced from the intake flow passage (not shown) to feed it into the exhaust flow passage (not shown).

A centrifugal compressor 30 is constituted of the impeller 14, the intake flow passage (not shown), and the exhaust flow passage (not shown). Thus, the geared centrifugal compressor 10 includes a pair of centrifugal compressors 30 that are disposed on opposite sides between which the speed-up transmission unit 20 is sandwiched for each of the bull gear shafts 18. Accordingly, the first bull gear shaft 18A is provided with a first centrifugal compressor 30A corresponding to the first impeller 14A and a second centrifugal compressor 30B corresponding to the second impeller 14B. The second bull gear shaft 18B is provided with a third centrifugal compressor 30C corresponding to the third impeller 14C and a fourth centrifugal compressor 30D corresponding to the fourth impeller 14D.

In this geared centrifugal compressor 10, the fluid compressed by the first impeller 14A of the first centrifugal compressor 30A which is the first-stage successively flows into the second centrifugal compressor 30B which is the second-stage, the third centrifugal compressor 30C which is the third-stage, and the fourth centrifugal compressor 30D which is the fourth-stage in that order. This fluid is further compressed in the process of flowing through the impellers 14 of the plurality of centrifugal compressors 30 in this way, and becomes a high-pressure fluid.

Figure 3:
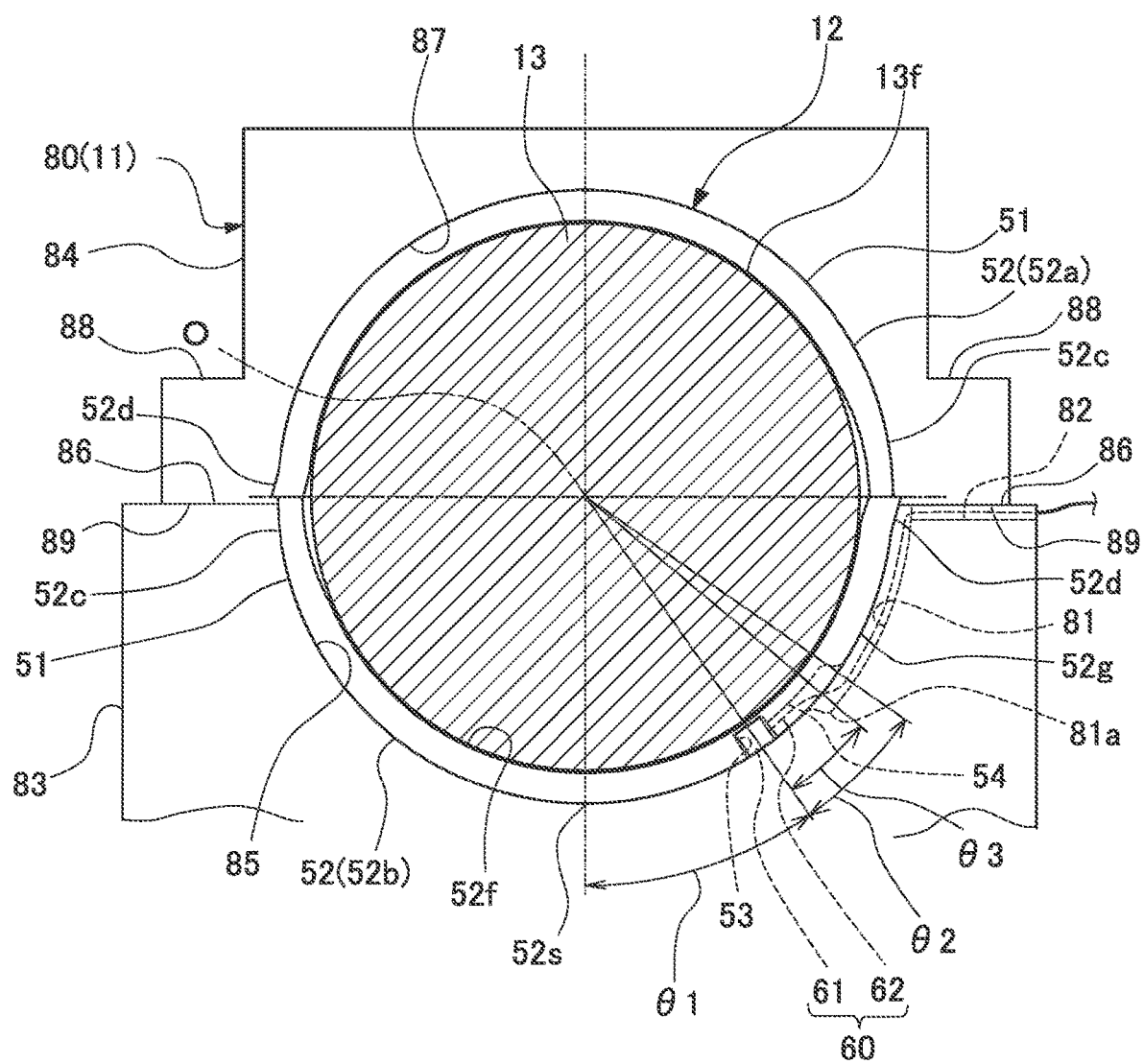
FIG. 3 is a sectional view illustrating a constitution of the journal bearing.
Figure 4:
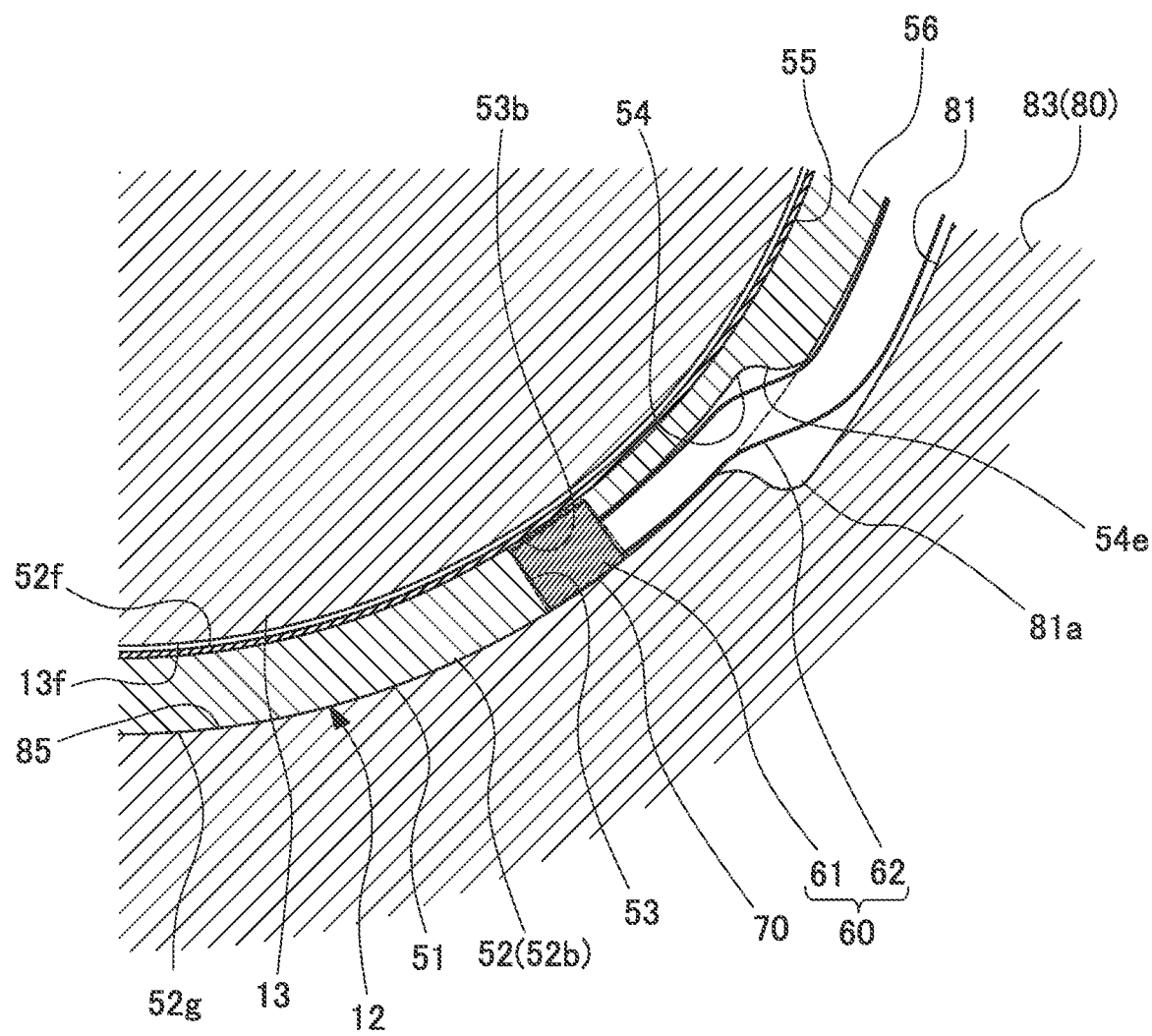
FIG. 4 is an enlarged sectional view illustrating a constitution of a key portion of the journal bearing.

FIG. 3 is a sectional view illustrating a constitution of the journal bearing in the present embodiment. FIG. 4 is an enlarged sectional view illustrating a constitution of a key portion of the journal bearing. As illustrated in FIG. 3, the journal bearing 12 includes a bearing member 51 and a temperature sensor 60.

The bearing member 51 supports the rotating shaft 13 to be rotatable around the central axis O. The bearing member 51 has a bearing main body 52 in which a recess 53 and a groove 54 are formed.

The bearing main body 52 has a cylindrical shape centered on the central axis O. The bearing main body 52 has a sliding contact surface 52f that can be brought into sliding contact with an outer circumferential surface 13f of the rotating shaft 13. The sliding contact surface 52f is directed inward in a radial direction. That is, the sliding contact surface 52f is an inner circumferential surface of the bearing main body 52. The bearing main body 52 includes a pair of two bearing bodies 52a and 52b. Each of the bearing bodies 52a and 52b has a semicylindrical shape. These bearing bodies 52a and 52b vertically face each other such that a horizontal surface is used as a division surface, and thereby the bearing main body 52 is formed in a cylindrical shape. Each of the bearing bodies 52a and 52b is configured such that a thickness thereof in a radial direction is gradually reduced from the other end 52d thereof in a circumferential direction toward one end 52c in the circumferential direction.

As illustrated in FIG. 4, the bearing main body 52 includes a babbit metal 55 that forms the sliding contact surface 52f, and a base metal 56 that is provided outside the babbit metal 55 in a radial direction and supports the babbit metal 55. The babbit metal 55 is formed of, for instance, a tin/lead alloy (so-called white metal). The base metal 56 is formed of, for instance, carbon steel such as S25C. The babbit metal 55 and the base metal 56 are integrally formed.

In this bearing main body 52, a thickness of the babbit metal 55 in a radial direction is, for instance, about 0.5 to 1.0 mm. For example, a thickness of the bearing main body 52 in a radial direction is preferably set to 5 mm or more and 15 mm or less. A more preferable thickness of the bearing main body 52 in the radial direction is 5 mm or more and 13 mm or less. As specific examples, if a diameter of the rotating shaft 13 is 300 mm or less, the thickness of the bearing main body 52 in the radial direction is preferably set to 7 mm or so. If the diameter is more than 300 mm and is equal to or less than 400 mm, the thickness is preferably set to 9 mm or so.

As illustrated in FIG. 3, the recess 53 is formed in an outer circumferential surface 52g of the bearing main body 52. The outer circumferential surface 52g is directed outward in a radial direction to face the side opposite to the sliding contact surface 52f. In the present embodiment, the recess 53 is formed in the bearing body 52b located at a lower side of the rotating shaft 13. The recess 53 is formed such that an angle θ1 to a lowermost portion 52s of the bearing main body 52 in a circumferential direction falls within a range of 30°±10°. As illustrated in FIG. 4, the recess 53 is formed to be recessed inward in a radial direction from the outer circumferential surface 52g of the bearing main body 52. A bottom 53b of the recess 53 which is located inside in a radial direction is located adjacent to the babbit metal 55 outside in the radial direction. That is, the recess 53 is formed in only the base metal 56, and is recessed so as not to reach the babbit metal 55. A sensor main body 61 is housed in the recess 53 so as not to protrude from the outer circumferential surface 52g.

Here, an interval between the bottom 53b of the recess 53 and the babbit metal 55 in a radial direction is preferably set to, for instance, 0.8 mm or so to make the bottom 53b as close as possible to the babbit metal 55 while securing strength of the base metal 56.

The groove 54 is recessed from the outer circumferential surface 52g to be continuous with the recess 53. The groove 54 extends along the outer circumferential surface 52g. The groove 54 of the present embodiment is formed in the base metal 56 successively from the recess 53. The groove 54 extends from the recess 53 in the circumferential direction around the central axis O. An end 54e of the groove 54 which is separated from the recess 53 is formed while being curved or inclined such that a depth of the groove is gradually reduced in proportion to a distance from the recess 53. That is, the end 54e is not formed perpendicular to the outer circumferential surface 52g. The end 54e of the present embodiment has an R shape curved in a convex form. A part of a sensor wiring 62, one end of which is connected to the sensor main body 61, in a length direction is housed in the groove 54. As illustrated in FIG. 3, the groove 54 is preferably formed such that an angle θ2 to a position at which the recess 53 is formed in a circumferential direction falls within a range of about 20°.

The temperature sensor 60 is a sensor that measures a temperature of the sliding contact surface 52f. The temperature sensor 60 has the sensor main body 61 and the sensor wiring 62.

The sensor main body 61 is housed in the recess 53 formed in the bearing member 51. Thereby, the sensor main body 61 is disposed at the lower side of the rotating shaft 13. A portion of the sensor main body 61 which measures a temperature is in contact with the bottom 53b of the recess 53. As illustrated in FIG. 4, the sensor main body 61 is fixed to the recess 53 by solidification of an adhesive 70 poured into the recess 53 in a state in which it is housed in the recess 53.

One end of the sensor wiring 62 is connected to the sensor main body 61. A part of the sensor wiring 62 which is close to the sensor main body 61 in a length direction in which the sensor wiring 62 extends is housed in the groove 54. In the vicinity of the end 54e of the groove 54, the sensor wiring 62 is led from the groove 54 outside in a radial direction. The end 54e of the groove 54 is formed in an R shape, and thereby the sensor wiring 62 is inhibited from being damaged at the end 54e of the groove 54 when the sensor wiring 62 is bent or when a corner of the groove 54 bites into the sensor wiring 62. The sensor wiring 62 is also fixed to the groove 54 via the adhesive 70 along with the sensor main body 61. Here, as illustrated in FIG. 3, a range within which the sensor wiring 62 is fixed by the adhesive 70 is preferably formed such that an angle θ3 to the position at which the recess 53 is formed in the circumferential direction falls within a range of about 15°.

The geared centrifugal compressor 10 includes a bearing cap 80 acting as a bearing casing that supports the journal bearings 12. The bearing cap 80 of the present embodiment is formed as a part of the casing 11. The bearing cap 80 includes a lower casing (a first support) 83 and an upper casing (a second support) 84 provided on the lower casing 83. That is, the bearing cap 80 can be divided into the lower casing 83 and the upper casing 84 such that a horizontal surface is used as a division surface.

The lower casing 83 is provided on a lower side of the rotating shaft 13. The lower casing 83 has a supporting recess 85 that is recessed downward and supports the bearing body 52b of the lower half of the journal bearing 12. The supporting recess 85 has a semicircular arc shape. The lower casing 83 includes mating surfaces 86 which are in contact with the upper casing 84 on opposite sides of the supporting recess 85 in a radial direction. Each of the mating surfaces 86 is formed in the radial direction. The mating surfaces 86 of the present embodiment are horizontal surfaces directed upward.

A wiring-housing groove 81 is formed in an inner circumferential surface of the lower casing 83. The wiring-housing groove 81 extends from one end 81a thereof in the circumferential direction around the central axis O, and is successively formed up to the mating surface 86. One end 81a of the wiring-housing groove 81 is formed at a position that faces a part of the groove 54 which is close to the end 54e of the groove 54 formed in the journal bearing 12 in a radial direction. That is, the wiring-housing groove 81 communicates with the groove 54 at one end 81a thereof. The sensor wiring 62 led out from the groove 54 is housed in the wiring-housing groove 81. An extension groove 82, which extends outward from the wiring-housing groove 81 in a radial direction, is formed in the mating surface 86.

The upper casing 84 has a supporting recess 87 that is recessed upward and supports the bearing body 52a of the upper half of the journal bearing 12. The supporting recess 87 has a semicircular arc shape. The upper casing 84 has flanges 88, which extend outward in a radial direction, on opposite sides of the supporting recess 87 in the radial direction. Each of the flanges 88 includes mating surfaces 89 that face the mating surface 86 of the lower casing 83 on lower sides thereof. Each of the mating surfaces 89 is formed in the radial direction. The mating surfaces 89 of the present embodiment are horizontal surfaces directed downward. The upper casing 84 is fastened to the lower casing 83 by bolts (not shown) or the like in a state in which the mating surfaces 89 on the opposite sides thereof in the radial direction are brought into contact with the mating surfaces 86 of the lower casing 83.

The journal bearing 12 is interposed between the supporting recess 85 of the lower casing 83 and the supporting recess 87 of the upper casing 84, and thereby is fixed. Here, when the lower bearing body 52b of the bearing main body 52 is housed in the supporting recess 85 in mounting the journal bearing 12 on the bearing cap 80, opposite ends of the bearing body 52b in a circumferential direction slightly protrude upward from the mating surfaces 86. When the upper casing 84 is fastened to the lower casing 83 by bolts (not shown), the bearing bodies 52a and 52b are crushed, and the entire bearing main body 52 in the circumferential direction becomes a perfect circle while coming into close contact with the inner circumferential surfaces of the supporting recesses 85 and 87.

As illustrated in FIG. 4, in the journal bearing 12, the sensor wiring 62, which is led out from the end 54e of the groove 54 outside in the radial direction, is housed in the wiring-housing groove 81 that faces the outer side thereof in the radial direction. The sensor wiring 62 extends up to the mating surface 86 through the wiring-housing groove 81 along the outer circumferential surface 52g of the journal bearing 12. The sensor wiring 62 is provided to extend from a joint between the lower casing 83 and the upper casing 84 (between the mating surface 86 and the mating surface 89) to the outside of the bearing cap 80 in the radial direction through the extension groove 82. The other end of the sensor wiring 62 is connected to a controller (not shown) or the like that is provided outside the casing 11. A temperature detected from a lower portion of the rotating shaft 13 by the sensor main body 61 is output to the controller.

Next, an assembling method for assembling the journal bearing 12 to the bearing cap 80 in assembling the geared centrifugal compressor 10 will be described.

Figure 5:
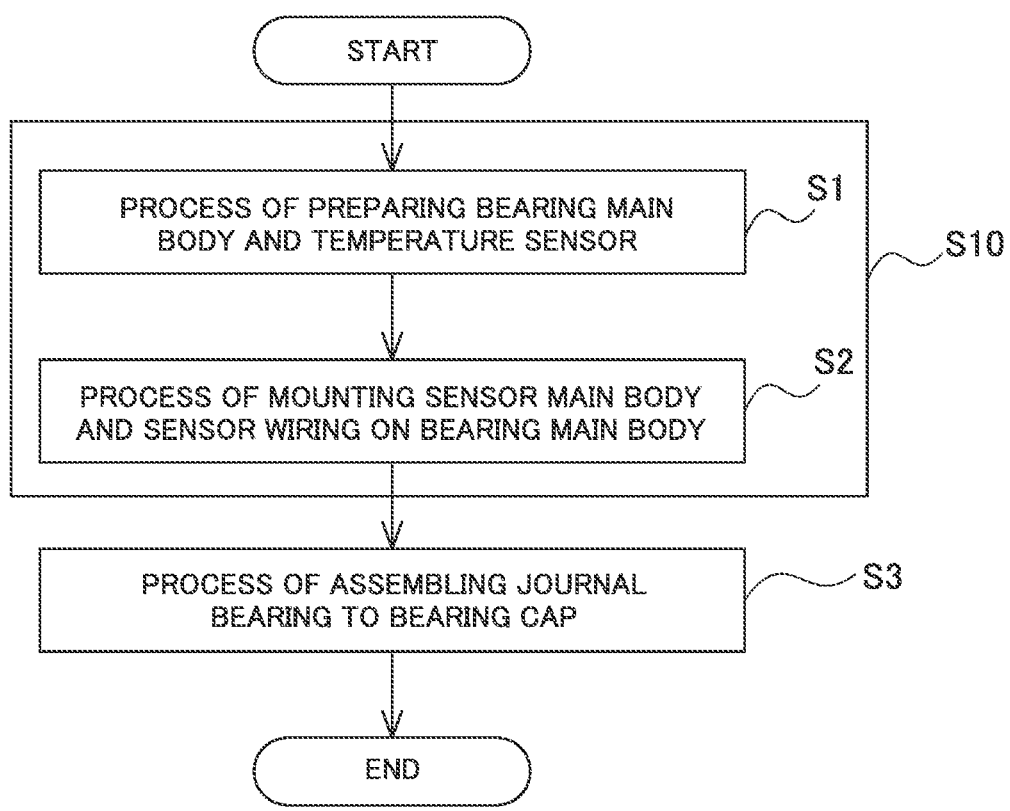
FIG. 5 is a flow chart illustrating a flow of an assembling method of the journal bearing in the embodiment of the present disclosure.

FIG. 5 is a flow chart illustrating a flow of an assembling method of the journal bearing in the present embodiment. This assembling method is to assemble the journal bearing, which is manufactured by a journal bearing-manufacturing method S10, to the bearing cap 80.

First, the bearing main body 52 and the temperature sensor 60 are prepared (process 51). To be specific, the bearing main body 52 is prepared by forming the recess 53 and the groove 54 in the outer circumferential surface 52g of the member in which the babbit metal 55 and the base metal 56 are integrally formed. Furthermore, the temperature sensor 60 is prepared by connecting the sensor wiring 62 to the sensor main body 61.

Then, the sensor main body 61 and the sensor wiring 62 are mounted on the bearing main body 52 (process S2). To be specific, the sensor main body 61 is housed in the recess 53 in the lower bearing body 52b of the bearing main body 52. A part of the sensor wiring 62, one end of which is connected to the sensor main body 61, in a length direction is housed in the groove 54. Furthermore, the adhesive 70 is poured into the recess 53 in which the sensor main body 61 is housed. Similarly, the adhesive 70 is poured into the groove 54 in which the sensor wiring 62 is housed. Then, the adhesive 70 is solidified, and thereby the sensor main body 61 is fixed in the recess 53 by the adhesive 70. Similarly, a portion of the sensor wiring 62, one end of which is connected to the sensor main body 61, is fixed in the groove 54 by the adhesive 70. Thereby, the journal bearing 12 having the temperature sensor 60 is manufactured.

Then, the manufactured journal bearing 12 is assembled to the bearing cap 80 (process S3). To be specific, to assemble the journal bearing 12 to the bearing cap 80, the lower bearing body 52b of the bearing main body 52 is housed in the supporting recess 85 of the lower casing 83 of the bearing cap 80 first. In this case, in the journal bearing 12, the sensor wiring 62, which is led from the end 54e of the groove 54 outside in the radial direction, is housed in the wiring-housing groove 81 that faces the outer side thereof in the radial direction.

Next, the rotating shaft 13 is set on the lower bearing body 52b. Then, the upper bearing body 52a of the bearing main body 52 is set on the rotating shaft 13. Furthermore, the upper casing 84 is placed on the upper bearing body 52a, and is set on the lower casing 83 by causing the mating surfaces 89 on the opposite sides thereof in the radial direction to face the mating surfaces 86 of the lower casing 83. In this case, the bearing body 52a preset in the supporting recess 87 of the upper casing 84 is set on the lower casing 83. Next, the upper casing 84 is fastened to the lower casing 83 through the flanges 88 on the opposite sides thereof in the radial direction by bolts (not shown) or the like. Thereby, the assembly of the journal bearing 12 is completed. The rotating shaft 13 is supported by the journal bearing 12 to be rotatable around the central axis O.

According to the journal bearings 12, the geared centrifugal compressor 10, and the journal bearing-manufacturing method S10 as described above, the sensor main body 61 and the part of the sensor wiring 62 in the length direction are housed in the recess 53 and the groove 54 of the outer circumferential surface 52g of the bearing main body 52. For this reason, the sensor main body 61 and the sensor wiring 62 can be disposed along the outer circumferential surface 52g of the bearing main body 52. Therefore, the sensor main body 61 and the sensor wiring 62 can be easily mounted on the bearing main body 52. In particular, the sensor wiring 62 needs only to extend along the groove 54 of the outer circumferential surface 52g of the bearing main body 52, and an effect of enabling easy mounting is great. The recess 53 and the groove 54 need only to be formed in the outer circumferential surface 52g of the bearing main body 52, and machining can be easily performed. Furthermore, the sensor main body 61 is housed in the recess 53 of the bearing main body 52 in advance, and simultaneously the part of the sensor wiring 62 in the length direction is housed in the groove 54 in advance. Thereby, the journal bearing 12 can be easily mounted in the geared centrifugal compressor 10. As a result, a degree of freedom of the wiring in the geared centrifugal compressor 10 is improved. Thereby, the temperature sensor 60 can be mounted in an easy and efficient manner.

The sensor main body 61 and the recess 53 are disposed at the lower side of the rotating shaft 13. With this constitution, an operation state of the rotating shaft 13 can be detected with high accuracy by the sensor main body 61 at the lower side of the rotating shaft 13 where a rise in temperature is easy due to a self-weight of the rotating shaft 13.

Legs or the like for supporting the geared centrifugal compressor 10 itself exist at the lower side of the rotating shaft 13, and it is difficult to arrange the sensor main body 61 and the sensor wiring 62 at the lower side of the rotating shaft 13. However, even in this case, the sensor main body 61 and the sensor wiring 62 are provided close to the journal bearing 12, and thus the mounting thereof can be easily performed.

In the groove 54, its end 54e at the side separated from the recess 53 is curved such that the depth of the groove is gradually reduced in proportion to the distance from the recess 53. With this constitution, an acute angle is not formed between the end 54e and the outer circumferential surface 52g, and an excessive force can be inhibited from being applied to the sensor wiring 62 housed in the groove 54.

At least the sensor main body 61 is fixed by pouring the adhesive 70 into the recess 53 and solidifying the adhesive 70. With this constitution, the sensor main body 61 can be easily and reliably fixed to the recess 53 with simple work.

The recess 53 and the groove 54 are formed in the base metal 56. With this constitution, the sensor main body 61 housed in the recess 53 can be disposed at the position at which it is made close to the babbit metal 55. The recess 53 is not made to reach the babbit metal 55, and thereby the strength of the babbit metal 55 can be secured.

The groove 54 extends in the circumferential direction around the central axis O. With this constitution, the sensor wiring 62 can be disposed to extend along the outer circumferential surface 52g of the journal bearing 12.

The geared centrifugal compressor 10 includes the wiring-housing groove 81 in which the sensor wiring 62 led from the groove 54 is housed for the bearing cap 80. With this constitution, the sensor wiring 62 led from the groove 54 can be housed and installed in the wiring-housing groove 81 formed in the bearing cap 80. Since the wiring-housing groove 81 can be formed in the inner circumferential surface of the bearing cap 80, the machining can be easily performed.

The wiring-housing groove 81 extends in the circumferential direction around the central axis O. With this constitution, the sensor wiring 62 can be arranged along the outer circumferential surface 52g of the journal bearing 12 in the circumferential direction. Furthermore, the sensor wiring 62 led from the wiring-housing groove 81 is passed through the joint between the lower casing 83 and the upper casing 84. Thereby, there is no need to provide a through-hole or the like for passing the sensor wiring 62 through the outside of the bearing cap 80 in the radial direction, and labor for machining can be suppressed.

Although the embodiment of the present disclosure has been described above in detail with reference to the drawings, the constitutions and combinations thereof in the embodiment are one example, and additions, omissions, substitutions, and other modifications of the constitution are possible without departing from the spirit and idea of the present disclosure. The present disclosure is not limited by the embodiment, but is only limited by the claims.

For example, in the aforementioned embodiment, the so-called multi-shaft multi-stage constitution has been described as the aspect of the geared centrifugal compressor 10 by way of example. However, the aspect of the geared centrifugal compressor 10 is not limited thereto, and one shaft and two stages, two shafts and four stages, or more than the numbers of shafts and stages above may be provided according to design or specification.

The present disclosure is not limited to the geared centrifugal compressor 10, and can be applied to a centrifugal compressor or the like of a type in which the rotating shaft 13 is directly rotatably driven by an external driving source.

Furthermore, the present disclosure is not limited to the compressor, and can also be applied to other rotary machines such as engines or turbines if the rotating shaft is supported by the journal bearings.

In the above embodiment, the sensor main body 61 of the temperature sensor 60 is provided in the journal bearing 12. However, without being limited to the temperature sensor, a sensor main body of another sensor may be provided. For example, to detect vibration of the rotating shaft, a pressure sensor or the like may be installed. In this case, the sensor main body may be provided on an upper side or the like of the rotating shaft 13 without being limited to the lower side of the rotating shaft 13.

While preferred embodiments of the disclosure have been described and illustrated above, it should be understood that these are exemplary of the disclosure and are not to be considered as limiting. Additions, omissions, substitutions, and other modifications can be made without departing from the spirit or scope of the present disclosure. Accordingly, the disclosure is not to be considered as being limited by the foregoing description, and is only limited by the scope of the appended claims.

EXPLANATION OF REFERENCES

10 Geared centrifugal compressor (rotary machine)
11 Casing
12 Journal bearing
13 Rotating shaft
13f Outer circumferential surface
14 Impeller
14A First impeller
14B Second impeller
14C Third impeller
14D Fourth impeller
15 Pinion gear
15A First pinion gear
15B Second pinion gear
16 Bull gear
17 Thrust bearing
18 Bull gear shaft
20 Speed-up transmission unit
21 Driving source
30 Centrifugal compressor
30A First centrifugal compressor
30B Second centrifugal compressor
30C Third centrifugal compressor
30D Fourth centrifugal compressor
51 Bearing member
52 Bearing main body
52a Bearing body
52b Bearing body
52c End
52d End
52f Sliding contact surface
52g Outer circumferential surface
52s Lowermost portion
53 Recess
53b Bottom
54 Groove
54e End
55 Babbit metal (Support)
56 Base metal (Support)
60 Temperature sensor
61 Sensor main body
62 Sensor wiring
70 Adhesive
80 Bearing cap (Bearing support)
81 Wiring-housing groove
81a One end
82 Extension groove
83 Lower casing (first support)
84 Upper casing (second support)
85 Supporting recess
86 Mating surface
87 Supporting recess
88 Flange
89 Mating surface
102 Radial bearing
O Central axis

What is claimed is:

1. A journal bearing that supports a rotating shaft to be rotatable around a central axis, comprising:
a bearing main body that includes:
a sliding contact surface that is brought into slidable contact with the rotating shaft and is directed inward in a radial direction,
an outer circumferential surface that is directed outward in the radial direction to face a side opposite to the sliding contact surface,
a recess that is recessed from the outer circumferential surface inward in the radial direction, and
a groove that is recessed from the outer circumferential surface to be continuous with the recess and extends along the outer circumferential surface;
a sensor main body housed in the recess; and
a sensor wiring whose one end is connected to the sensor main body and in which a part thereof in a length direction is housed in the groove, wherein
the bearing main body includes:
a babbit metal that forms the sliding contact surface, and
a support that is provided at an outer side of the babbit metal in the radial direction and supports the babbit metal; and
the recess and the groove are formed in the support.

2. The journal bearing according to claim 1, wherein the groove extends from the recess in a circumferential direction around the central axis.

3. The journal bearing according to claim 1, wherein
the sensor main body detects a temperature; and
the recess and the sensor main body are disposed at a lower side of the rotating shaft.

4. The journal bearing according to claim 3, wherein the groove extends from the recess in a circumferential direction around the central axis.

5. The journal bearing according to claim 3, wherein an end of the groove that is separated from the recess is curved or inclined such that a depth of the groove is gradually reduced in proportion to a distance from the recess.

6. The journal bearing according to claim 5, wherein the groove extends from the recess in a circumferential direction around the central axis.

7. The journal bearing according to claim 1, wherein an end of the groove that is separated from the recess is curved or inclined such that a depth of the groove is gradually reduced in proportion to a distance from the recess.

8. The journal bearing according to claim 7, wherein the groove extends from the recess in a circumferential direction around the central axis.

9. A journal bearing-manufacturing method, comprising:
a process of preparing: a bearing main body that has a sliding contact surface that is brought into slidable contact with the rotating shaft and is directed inward in a radial direction, an outer circumferential surface that is directed outward in the radial direction to face a side opposite to the sliding contact surface, a recess that is recessed from the outer circumferential surface inward in the radial direction, and a groove that is recessed from the outer circumferential surface to be continuous with the recess and extends along the outer circumferential surface; a sensor main body that is able to be housed in the recess; and a sensor wiring whose one end is connected to the sensor main body and in which a part thereof in a length direction is able to be housed in the groove; and
a process of housing the sensor main body in the recess of the bearing main body, housing the part of the sensor wiring whose one end is connected to the sensor main body in the groove, and fixing the sensor main body in the recess using an adhesive.

\* \* \* \* \*